Nov. 24, 1959 A. R. SPICACCI 2,914,365
ANTI-FRICTION BEARINGS
Filed March 18, 1958
FIG_1_ FIG_3_ FIG_2_
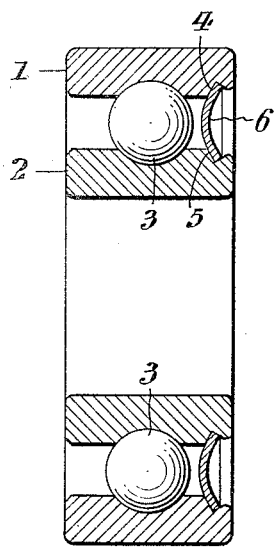
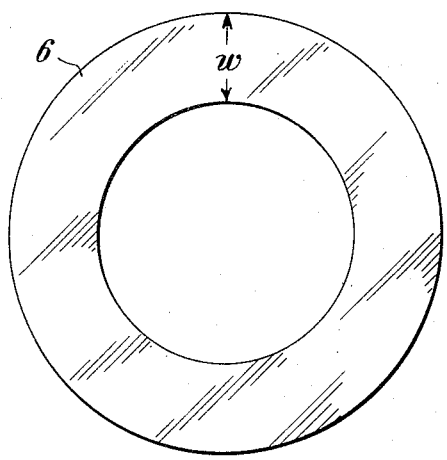
FIG_5_ FIG_4_
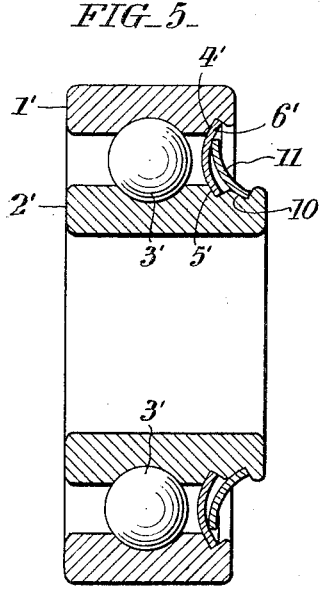
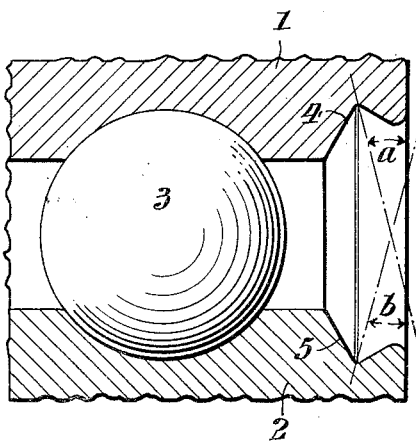
INVENTOR:
Attilio R. Spicacci,
BY
ATTORNEYS.

United States Patent Office 2,914,365
Patented Nov. 24, 1959

2,914,365

ANTI-FRICTION BEARINGS

Attilio R. Spicacci, Philadelphia, Pa., assignor to Channing Corporation, New York, N.Y., a corporation of California Application March 18, 1958, Serial No. 722,177

3 Claims. (Cl. 308—187.2)

This invention relates to anti-friction bearings, that is to say, to bearings wherein multiple rolling elements, such for example as balls, are interposed between complementally grooved outer and inner race components.

The aim of my invention is to provide, for incorporation in such bearings, a simple inexpensive and easily applied and replaceable means for sealing them for retainment of lubricating oil or grease and exclusion of dirt such as would result in rapid wear, without attendant restriction to the free movement of the relatively rotating parts.

In the attached drawings:

Fig. 1 is a view, in axial section, of a ball type anti-friction bearing conveniently embodying my invention.

Fig. 2 shows the face view of a flexible disk by which the bearing is sealed in accordance with my invention as hereinafter set forth for retainment of lubricant and exclusion of dirt.

Fig. 3 shows the disk of Fig. 2 in cross section.

Fig. 4 is a fragmentary view drawn to a larger scale and showing the bearing in section before application of the sealing ring; and Fig. 5 is a view similar to Fig. 1 showing a modification.

With more detailed reference first to Fig. 1 of these illustrations, the numeral 1 designates the internally-grooved outer race component of the bearing, the numeral 2 the peripherally grooved inner race component, and the numeral 3 the interposed rolling elements or balls. In accordance with my invention, the outer race component 1 is provided, immediately inward of one side, with an internal annular recess 4, and the inner race component 2 with a correspondingly-disposed circumferential recess 5 in the same plane with the recess 4. From Fig. 4 it will be noted that the recesses 4 and 5 are V-shaped in cross section and pitched inwardly at complemental angles $a$ and $b$ acute to the side faces of the respective components 1 and 2. In practice, the sealing element 6, separately shown in Figs. 2 and 3, is fashioned as a disk from neoprene or other flexible and resilient material, the outer diameter of said disk being greater than that of the internal annular recess 4 of the race component 1, the inner diameter of said disk being less than that of the circumferential recess in the race component 2, and the width $w$ of the disk being greater, in turn, than the width of the annular interval between the two race components. In applying the sealing disk 6, it is pressed laterally into the annular interval between the race components 1 and 2 incident to which the outer and inner edges thereof snap respectively into the recesses 4 and 5 of said components. By virtue of its flexibility and resiliency, the disk 6 will assume an arcuate shape in cross section, its outer and inner edges being thereby maintained in pressure sealing engagement within the annular retaining recesses 4 and 5 in the raceway components 1 and 2. Due to the cross sectional configuration and inward angular disposal of the recesses 4 and 5, the disk 6 is caused to bulge inwardly on a curve in the annular space between the race components as shown in Fig. 1. It is to be particularly noted that the allocation of the recesses 4 and 5 in the bearing components 1 and 2 is such that the disk 6 does not touch the balls 3 when in place. As wear of the sealing disk 6 occurs through friction of its edges with the surfaces of the recesses 4 and 5 during relative rotation of the bearing components 1 and 2, the wear is constantly taken up due to the resiliency of the material from which said disk is formed.

Although flexible in the free state, the stiffness necessary for the proper functioning of the sealing disk is provided as a consequence of its being bulged as it is snapped into place. The need for incorporation with the disk of stiffening metal is thus obviated. While having the necessary rigidity for maintenance of a perfect seal, the disk is also flexible angularly after the manner of an accordion and is therefore capable of compensating for misalignment of the race components of the bearing without impairment of the sealing efficiency.

If desired, the recesses 4 and 5 may, by way of modification, be angularly pitched outwardly instead of inwardly as herein shown by way of example in which case the sealing disk would be bulged outwardly incident to being snapped into place.

Except as hereinafter pointed out, the alternative construction of Fig. 5 is identical with that of the first described embodiment. Accordingly, in order to obviate the necessity for duplicate description, all the elements in the modification, having their counterparts in the first described embodiment, are identified by the same reference numerals previously employed but with addition, in each instance, of a prime for convenience of more ready distinction. In this alternative embodiment, the race component 2' is extended and protrudes beyond component 1' at one side of the bearing. At a substantial distance outward of the recess 5', the component 2' is provided with an additional circumferential recess 10 which has a cross sectional configuration substantially identical with that of said recess 5' and which is similarly pitched inwardly at a corresponding angle. The retaining element designated 11 is likewise substantially identical with the sealing disk 6' and is stretched about the extended end portion of the inner race component 2' with incidental snapping of its inner edge into the additional recess 10, and is biased inwardly as a consequence of stretching so that its outer edge presses against the sealing disk 6' to sustain the latter against outward displacement and to increase the sealing efficiency thereof as will be readily understood from the illustration.

I do not of course consider myself restricted to the precise details of the constructions herein disclosed by way of example since, as will be readily appreciated by those skilled in the art, various other modifications may be made without departing from the invention as hereinafter claimed.

Having thus described my invention, I claim:

1. In an anti-friction bearing having plural rolling elements engaged between an internally grooved outer race component and an externally grooved inner race component, the outer race component being provided inward of one side with an internal peripheral recess, and the inner race component being provided inward of the corresponding side with an external circumferential recess substantially in the same plane with the recess in the outer race component: a sealing element fashioned from flexible resilient material to the form of a disk of which the outer diameter is somewhat greater than that of the internal annular recess of the outer raceway component and of which the inner diameter is somewhat less than that of the annular circumferential recess in the inner race component, said disk being sprung laterally into the annular interval between the two raceway components and its outer edge incidentally engaged into the internal annular recess of the outer raceway component, and its inner edge engaged into the external annular recess of the inner race component, and caused to assume an arcuate cross section, the recesses respectively in the two components of the bearing being V-shaped in cross section with their axes inwardly inclined at complemental angles acute to the corresponding side of the bearing to determine flexing and inward bulging of the sealing disk as it is sprung into place.

2. In an anti-friction bearing having plural rolling elements engaged between an internally grooved outer race component and an externally grooved inner race component, the outer race component being provided inward of one side with an internal peripheral recess, and the inner race component being provided inward of the corresponding side with an external circumferential recess substantially in the same plane with the recess in the outer race component: a sealing element fashioned from flexible resilient material to the form of a disk of which the outer diameter is somewhat greater than that of the internal annular recess of the outer raceway component, and of which the inner diameter is somewhat less than the diameter of the annular circumferential recess in the inner race component, said disk being sprung laterally into the annular interval between the two raceway components and its outer edge incidentally engaged into and about the internal annular recess of the outer raceway component, and its inner edge engaged into and about the external annular recess of the inner race component, and caused to assume an arcuate cross section for spring action, the inner component of the bearing being extended outwardly beyond the outer component at the one side of the bearing, and provided outwardly beyond the circumferential recess therein with an additional circumferential recess; and further including a second or auxiliary disk similar to the first described disk sprung about the extended end of the inner component with its inner edge engaged into the additional annular recess and with its outer edge pressing inwardly against the first mentioned disk.

3. In an anti-friction bearing having plural rolling elements engaged between an internally grooved outer race component and an externally grooved inner race component, the outer race component being provided inward of one side with an internal peripheral recess, and the inner race component being provided inward of the corresponding side with an external circumferential recess substantially in the same plane with the recess in the outer race component; a sealing element fashioned from flexible resilient material to the form of a disk of which the outer diameter is somewhat greater than that of the internal annular recess of the outer raceway component and of which the inner diameter is somewhat less than that of the annular circumferential recess in the inner race component, said disk being sprung laterally into the annular interval between the two raceway components and its outer edge incidentally engaged into and about the internal annular recess of the inner race component and caused to assume an arcuate cross section, the inner component of the bearing being extended outwardly beyond the outer component at the one side of the bearing, and the recesses respectively in the two components being V-shaped in cross section and pitched inwardly at complemental angles acute to the corresponding sides of the respective components to determine flexing and inward arcuate bulging of the sealing disk as it is sprung into place, and the inner component of the bearing being provided outwardly beyond its circumferential recess with an additional circumferential recess V-shaped in cross section and pitched inwardly at an acute angle; and further including a second or auxiliary disk similar to the first mentioned disk sprung about the protruding end of the inner component of the bearing with its inner edge engaged into and about the additional annular recess and its outer edge pressing inwardly against the first mentioned disk.

References Cited in the file of this patent

UNITED STATES PATENTS 2,823,967  Harrington _____ Feb. 18, 1958

FOREIGN PATENTS 978,288  France _____ Nov. 22, 1950